(12) United States Patent
Kennedy et al.

(10) Patent No.: US 8,101,015 B2
(45) Date of Patent: *Jan. 24, 2012

(54) COATINGS AND HARD MASK COMPOSITIONS FOR INTEGRATED CIRCUIT APPLICATIONS METHODS OF PRODUCTION AND USES THEREOF

(75) Inventors: Joseph Kennedy, Morristown, NJ (US); Wei T. Huang, Morristown, NJ (US); Kim Do, Morristown, NJ (US); Jason Stuck, San Jose, CA (US); Bo Li, Morristown, NJ (US)

(73) Assignee: Honeywell International Inc., Morristown, NJ (US)

( * ) Notice: Subject to any disclaimer, the term of this patent is extended or adjusted under 35 U.S.C. 154(b) by 1608 days.

This patent is subject to a terminal disclaimer.

(21) Appl. No.: 10/570,750

(22) PCT Filed: Oct. 5, 2004

(86) PCT No.: PCT/US2004/032789
§ 371 (c)(1), (2), (4) Date: Mar. 6, 2006

(87) PCT Pub. No.: WO2005/037907
PCT Pub. Date: Apr. 28, 2005

(65) Prior Publication Data
US 2007/0022909 A1  Feb. 1, 2007

Related U.S. Application Data

(60) Provisional application No. 60/509,199, filed on Oct. 7, 2003.

(51) Int. Cl.
*C09D 183/08* (2006.01)
(52) U.S. Cl. .......... 106/287.11; 528/31; 528/34; 528/38
(58) Field of Classification Search .................. 428/447; 528/31, 34; 106/287.11
See application file for complete search history.

(56) References Cited

U.S. PATENT DOCUMENTS

| | | | |
|---|---|---|---|
| 4,277,287 A | | 7/1981 | Frye |
| 4,624,870 A | | 11/1986 | Anthony |
| 4,778,624 A | * | 10/1988 | Ohashi et al. ................ 516/67 |
| 4,781,844 A | * | 11/1988 | Kortmann et al. ......... 428/423.1 |
| 5,102,967 A | | 4/1992 | Meder |
| 5,152,834 A | * | 10/1992 | Allman ................ 106/287.13 |
| 5,472,488 A | * | 12/1995 | Allman ................ 106/287.16 |
| 5,614,603 A | | 3/1997 | Harkness et al. |
| 5,953,627 A | * | 9/1999 | Carter et al. ................ 438/623 |
| 5,989,767 A | | 11/1999 | Yoerger et al. |
| 6,506,497 B1 | * | 1/2003 | Kennedy et al. ............. 428/447 |
| 6,589,889 B2 | * | 7/2003 | Endisch et al. ............. 438/780 |
| 6,824,879 B2 | * | 11/2004 | Baldwin et al. ............. 428/447 |
| 7,297,360 B2 | * | 11/2007 | Yoshioka et al. ............ 427/96.1 |
| 2001/0024685 A1 | | 9/2001 | Boulton |
| 2002/0095018 A1 | * | 7/2002 | Baldwin et al. ................ 528/39 |
| 2002/0128388 A1 | * | 9/2002 | Kennedy et al. ............. 525/100 |
| 2003/0032274 A1 | * | 2/2003 | Daniels et al. ............... 438/597 |

FOREIGN PATENT DOCUMENTS

WO WO03044078 A1 * 5/2003

* cited by examiner

*Primary Examiner* — Margaret Moore
(74) *Attorney, Agent, or Firm* — Sandra P. Thompson; Buchalter Nemer

(57) ABSTRACT

A coating material is described herein that includes at least one inorganic compound, and at least one densifying agent, wherein the densifying agent increases the density of the coating material as compared to the density of the at least one inorganic compound. A method of producing a coating material is described herein that includes: providing at least one inorganic compound, providing at least one densifying agent, combining the at least one inorganic compound with the at least one densifying agent to form the coating material, wherein the densifying agent increases the density of the coating material as compared to the density of the at least one inorganic compound.

16 Claims, 10 Drawing Sheets

2-hydroxy-4-(3-triethoxysilylpropoxy)-
diphenylketone
10

2-hydroxy-4-(3-trimethoxysilylpropoxy)-
diphenylketone
11

2-hydroxy-4-(3-tributoxysilylpropoxy)-
diphenylketone
12

2-hydroxy-4-(3-tripropoxysilylpropoxy)-
diphenylketone
13 rosolic acid
14 triethoxysilylpropyl-1,8-naphthalimide
15 trimethoxysilylpropyl-1,8-naphthalimide
16 tripropoxysilylpropyl-1,8-naphthalimide
17

**4-ethoxyphenylazobenzene-4-carboxy
propyl triethoxysilane
32**

**4-butoxyphenylazobenzene-4-carboxy
propyl triethoxysilane
33**

**4-methoxyphenylazobenzene-4-carboxy
methyl triethoxysilane
34**

**4-ethoxyphenylazobenzene-4-carboxy
methyl triethoxysilane
35**

**4-methoxyphenylazobenzene-4-carboxy
ethyl triethoxysilane
36**

4-methoxyphenylazobenzene-4-carboxy
propyl triethoxysilane
37

COATINGS AND HARD MASK COMPOSITIONS FOR INTEGRATED CIRCUIT APPLICATIONS METHODS OF PRODUCTION AND USES THEREOF

This application is based on U.S. Provisional Application Ser. No. 60/509,199 filed on Oct. 7, 2003, which is commonly-owned and incorporated herein in its entirety by reference.

FIELD OF THE SUBJECT MATTER

The present invention relates generally to coating and hard mask materials and compositions.

BACKGROUND OF THE SUBJECT MATTER

Electronic and semiconductor components are used in ever-increasing numbers of consumer and commercial electronic products, communications products and data-exchange products. Examples of some of these consumer and commercial products are televisions, computers, cell phones, pagers, palm-type or handheld organizers, portable radios, car stereos, or remote controls. As the demand for these consumer and commercial electronics increases, there is also a demand for those same products to become smaller and more portable for the consumers and businesses.

As a result of the size decrease in these products, the components that comprise the products must also become smaller and/or thinner. Examples of some of those components that need to be reduced in size or scaled down are microelectronic chip interconnections, semiconductor chip components, resistors, capacitors, printed circuit or wiring boards, wiring, keyboards, touch pads, and chip packaging.

When electronic and semiconductor components are reduced in size or scaled down, any defects that are present in the larger components are going to be exaggerated in the scaled down components. Thus, the defects and discontinuities that are present or could be present in the larger component should be identified and corrected, if possible, before the component is scaled down for the smaller electronic products.

In order to identify and correct defects in electronic, semiconductor and communications components, the components, the materials used and the manufacturing processes for making those components should be broken down and analyzed. Electronic, semiconductor and communication/data-exchange components are composed, in some cases, of layers of materials, such as metals, metal alloys, ceramics, inorganic materials, polymers, or organometallic materials. The layers of materials are often thin (on the order of less than a few tens of angstroms in thickness). In order to improve on the quality of the layers of materials, the process of forming the layer—such as physical vapor deposition of a metal or other compound—should be evaluated and, if possible, modified and improved.

To meet the requirements for faster performance, the characteristic dimensions of features of integrated circuit devices have continued to decrease. Manufacturing of devices with smaller feature sizes introduces new challenges in many of the processes conventionally used in semiconductor fabrication.

Certain applications, such as tri-level photoresist schemes, in the Integrated Circuits (IC) industry require that a spin-on silicate film be used as a sacrificial hard mask. A dense hard mask is required to accurately transfer a pattern into the underlying film. If the hard mask is too soft (not dense enough) it is more easily eroded away in the underlying etch processes, thereby degrading the ability of accurate pattern transfer. In photolithography with chemically amplified resists, a certain degree of film density is a requirement of the substrate film, such as a UV absorbing organosiloxane film, to inhibit the diffusion of acid from the resist into itself. The loss of acid through diffusion into the underlying film leads to resist footing. Interface mismatch can also lead to problems, such as resist collapse. Thermal budgets limit how dense the silicate or siloxane-based films can be made through thermal processing. For the tri-layer resist process, the denser the silicate film, the better the pattern transfer through the underlying films.

Therefore, a coating and hard mask material should be developed that a) has increased density as compared with conventionally coating materials; b) has improved dry etch rates as compared with conventionally coating materials; c) can optionally absorb strongly and uniformly in the ultraviolet spectral region, d) can minimize resist footing, and e) would be impervious to photoresist developers and methods of production of the anti-reflective coating described would be desirable to advance the production of layered materials, electronic components and semiconductor components.

SUMMARY OF THE SUBJECT MATTER

A coating material is described herein that includes at least one inorganic compound, and at least one densifying agent, wherein the densifying agent increases the density of the coating material as compared to the density of the at least one inorganic compound.

A method of producing a coating material is described herein that includes: providing at least one inorganic compound, providing at least one densifying agent, combining the at least one inorganic compound with the at least one densifying agent to form the coating material, wherein the densifying agent increases the density of the coating material as compared to the density of the at least one inorganic compound.

DESCRIPTION OF THE SUBJECT MATTER

Figure 1A:
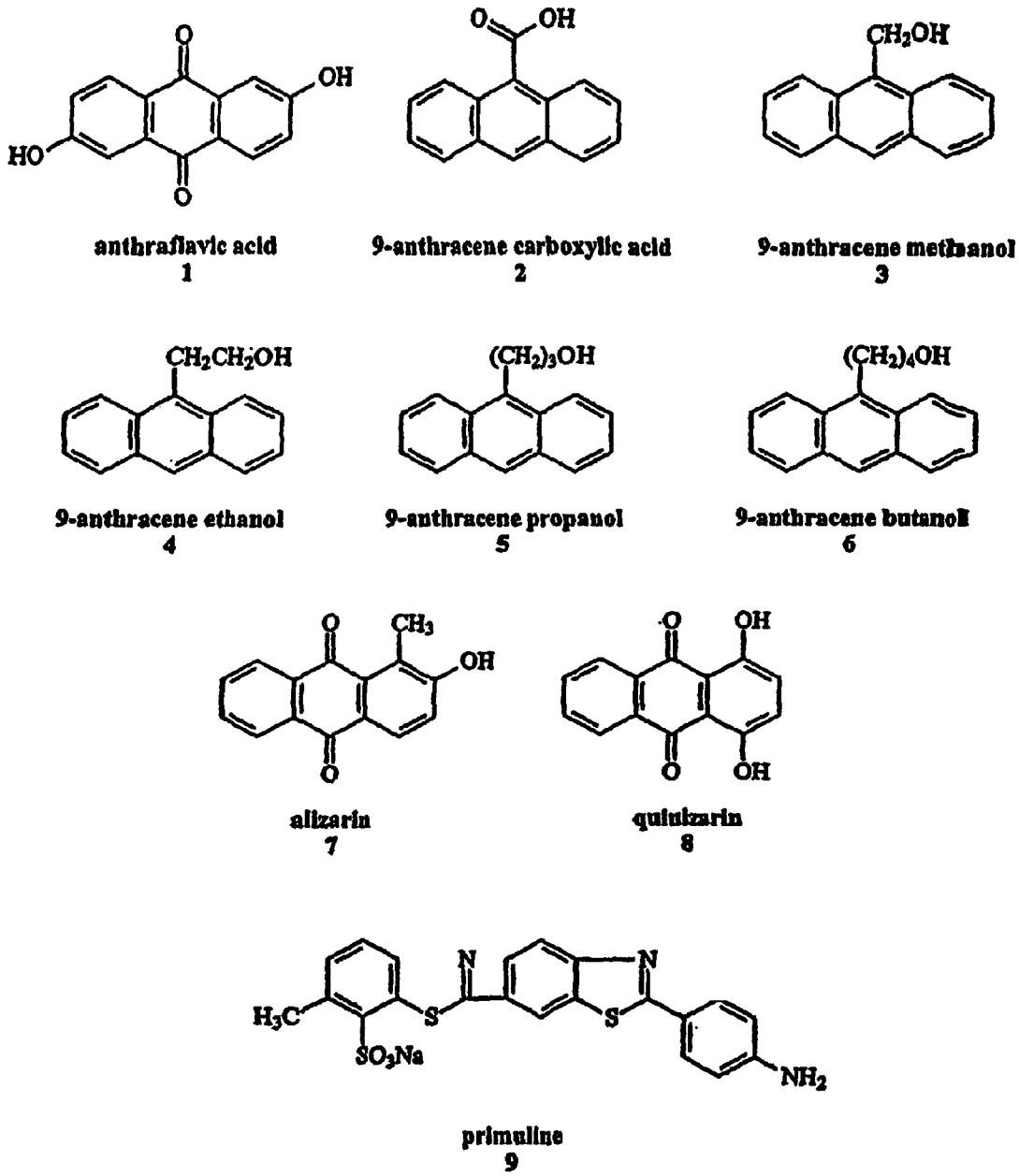
FIGS. 1A-1F show contemplated absorbing compounds for some contemplated embodiments.
Figure 1B:
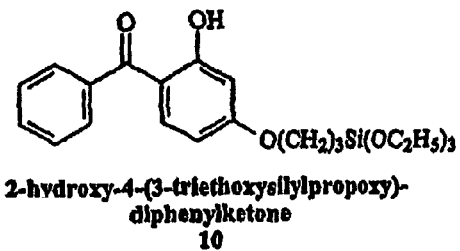
Figure 1B:
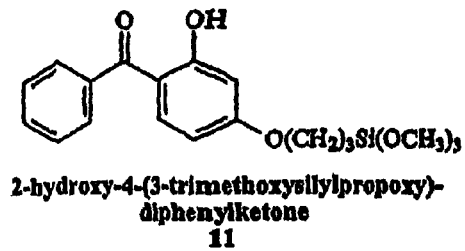
Figure 1B:
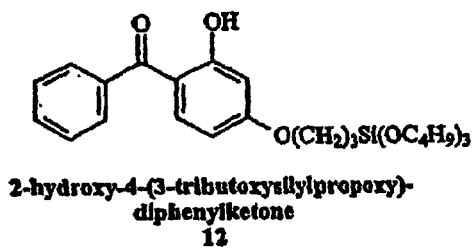
Figure 1B:
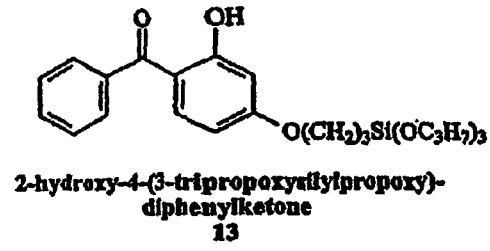
Figure 1B:
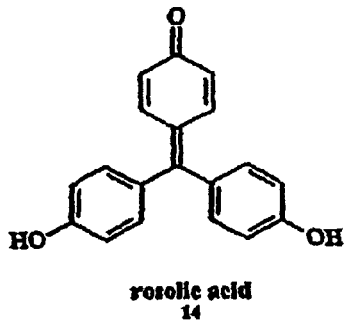
Figure 1B:
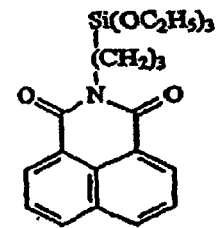
Figure 1B:
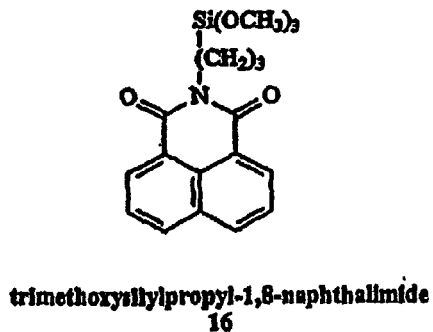
Figure 1B:
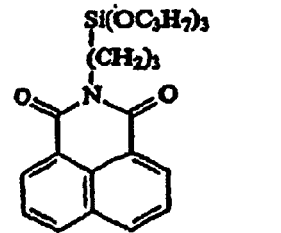
Figure 1C:
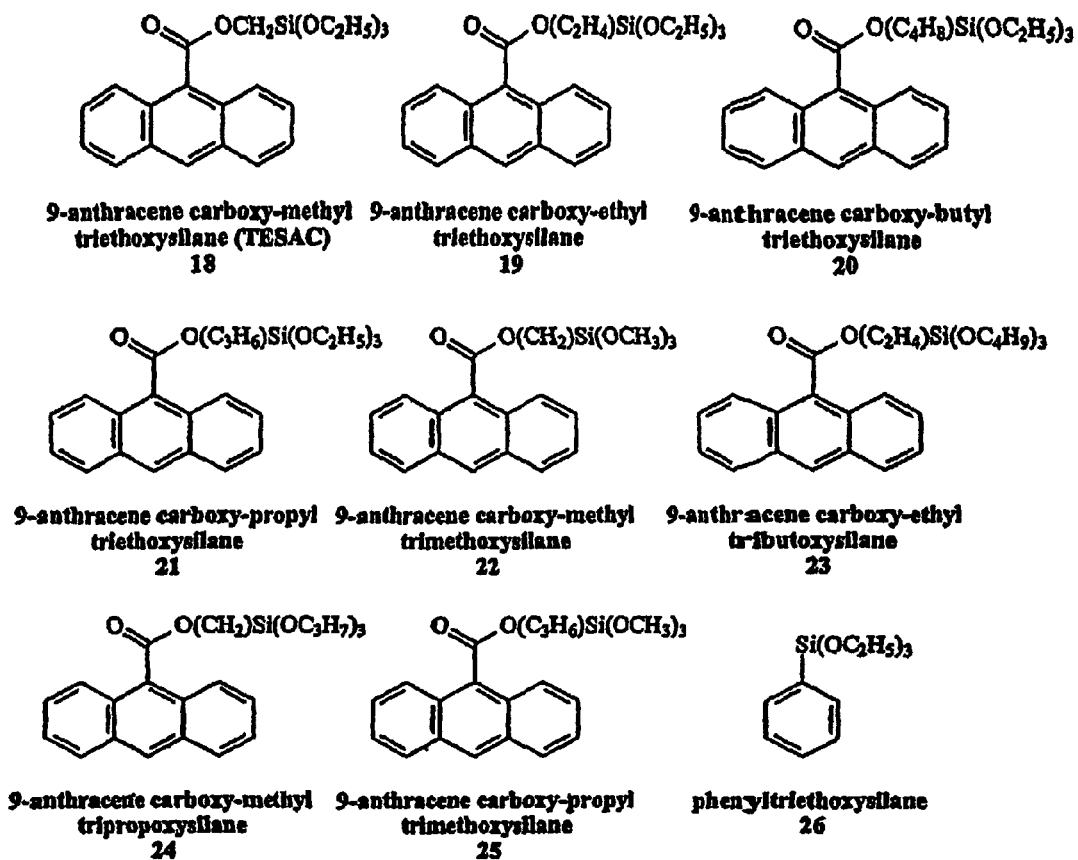
Figure 1D:
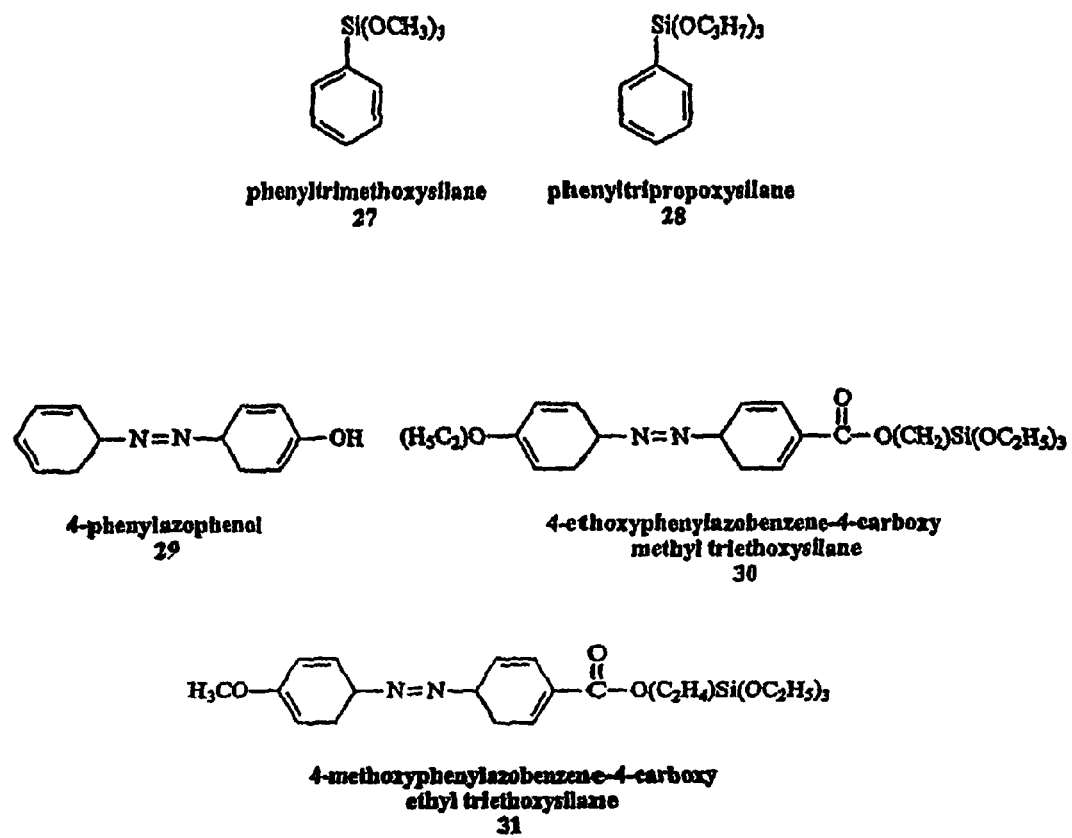
Figure 1E:
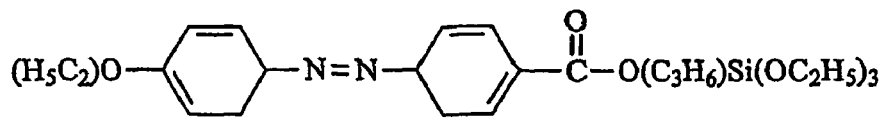
Figure 1E:
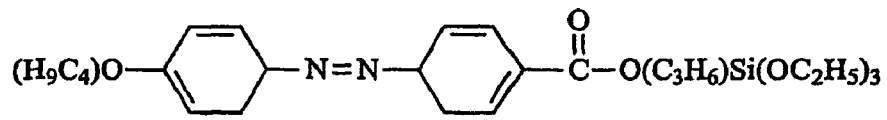
Figure 1E:
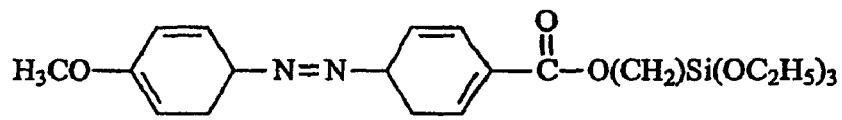
Figure 1E:
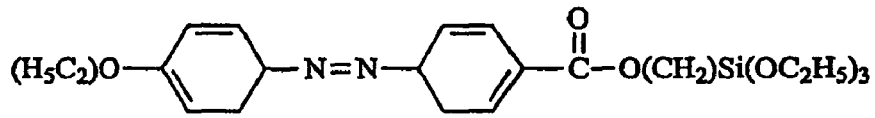
Figure 1E:
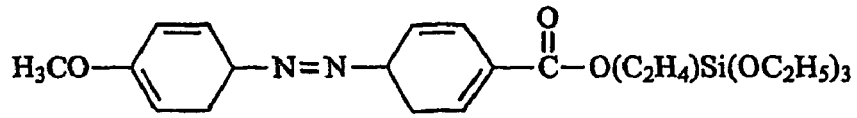
Figure 1F:
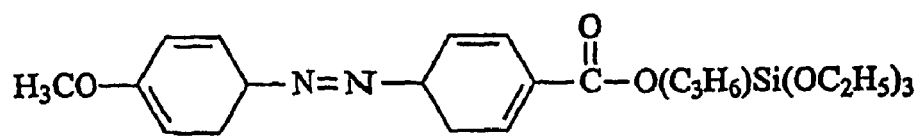

In response to the goals previously stated for coating and hard mask materials, a composition has been developed that: a) has increased density as compared with conventionally coating materials; b) has improved dry etch rates as compared with conventionally coating materials; c) can optionally absorb strongly and uniformly in the ultraviolet spectral region, d) can minimize resist footing, and e) is impervious to photoresist developers and methods of production of the anti-reflective coating described would be desirable to advance the production of layered materials, electronic components and semiconductor components. It has been shown that the density of the coating materials and hard mask materials described herein that are spun-on and baked is similar to that of CVD-deposited TEOS-based siloxane films.

Contemplated coating materials and/or hard mask compositions for integrated circuits applications includes at least one densifying agent or density-tuning agent incorporated into an inorganic material and/or inorganic composition or spin-on-glass (SOG) material, wherein the coating material has a density that is higher than the density of a reference composition and/or material. The coating materials and/or hard mask compositions are formed into coating solutions by dissolving the at least one inorganic material, inorganic composition and/or spin-on-glass material, along with at least one densifying agent, in appropriate solvents. These coating solutions may be applied to various layers of materials, substrates and surfaces in fabricating layered and multiple layered materials, electronic devices, and semiconductor devices. The coating materials, hard mask compositions and/or coating solutions are designed to be readily integrated into existing layered material, electronic component or semiconductor fabrication processes. Some properties of the coating materials, hard mask compositions and/or coating solutions that facilitate integration include a) developer resistance, b) thermal stability during standard photoresist processing, and c) selective removal with respect to underlying layers.

Contemplated inorganic materials, spin-on inorganic materials and/or spin-on-glass materials comprise inorganic-based compounds, such as silicon-based, gallium-based, germanium-based, arsenic-based, boron-based compounds or combinations thereof. As used herein, the phrases "spin-on material", "spin-on organic material", "spin-on composition" and "spin-on inorganic composition" may be used interchangeable and refer to those solutions and compositions that can be spun-on to a substrate or surface. It is further contemplated that the phrase "spin-on-glass materials" refers to a subset of "spin-on inorganic materials", in that spin-on glass materials refer to those spin-on materials that comprise at least one silicon-based compound and/or polymer in whole or in part. Furthermore, "spin-on inorganic materials" is a subset of "inorganic materials", as used herein. Examples of silicon-based compounds comprise at least one siloxane compound, such as methylsiloxane, methylsilsesquioxane, phenylsiloxane, phenylsilsesquioxane, methylphenylsiloxane, methylphenylsilsesquioxane, silazane polymers, silicate polymers, silsilic acid derivatives and mixtures thereof. A contemplated silazane polymer is perhydrosilazane, which has a "transparent" polymer backbone where chromophores can be attached.

Contemplated inorganic materials, spin-on inorganic materials and/or spin-on-glass materials also include at least one siloxane polymer or blockpolymer, hydrogensiloxane polymers of the general formula $(H_{0-1.0}SiO_{1.5-2.0})_x$ hydrogensilsesquioxane polymers, which have the formula $(HSiO_{1.5})_x$, where x is greater than about four and combinations thereof. Also included are copolymers of hydrogensilsesquioxane and an alkoxyhydridosiloxane or hydroxyhydridosiloxane. Inorganic materials, spin-on inorganic materials and/or spin-on-glass materials additionally include organohydridosiloxane polymers of the general formula $(H_{0-1.0}SiO_{1.5-2.0})_n(R_{0-1.0}SiO_{1.5-2.0})_m$, organohydridosilsesquioxane polymers of the general formula $(HSiO_{1.5})_n(RSiO_{1.5})_m$, where m is greater than zero and the sum of n and m is greater than about four and R is alkyl or aryl or combinations thereof. Some useful organohydridosiloxane polymers have the sum of n and m from about four to about 5000 where R is a $C_1$-$C_{20}$ alkyl group or a $C_6$-$C_{12}$ aryl group. Some specific examples include alkylhydridosiloxanes, such as methylhydridosiloxanes, ethylhydridosiloxanes, propylhydridosiloxanes, t-butylhydridosiloxanes, phenylhydridosiloxanes; and alkylhydridosilsesquioxanes, such as methylhydridosilsesquioxanes, ethylhydridosilsesquioxanes, propylhydridosilsesquioxanes, t-butylhydridosilsequioxanes, phenylhydridosilsesquioxanes, and combinations thereof.

The at least one densifying agent comprises at least one compound, material or solution that is added to the mixture of the inorganic materials, spin-on inorganic materials and/or spin-on-glass materials in order to "tune" or adjust the density of the final composition so that the density or other related physical characteristics of the final material are increased relative to the reference material, including those with absorption peaks around 365 nm, 248 nm, 193 nm and 157 nm. As used herein, the "reference material" is that material that comprises each component of the contemplated composition described herein except the densifying agent. The "reference material" is meant to be a benchmark composition to which contemplated compositions may be compared.

It is contemplated that the density of contemplated coating solutions, coating materials and/or hard mask compositions has a density that is at least 10% higher than the density of the reference material. It is further contemplated that the density of contemplated coating solutions, coating materials and/or hard mask compositions has a density that is at least 25% higher than the density of the reference material. It is also contemplated that the density of contemplated coating solutions, coating materials and/or hard mask compositions has a density that is at least 40% higher than the density of the reference material. In some embodiments, the density of contemplated coating solutions, coating materials and/or hard mask compositions has a density that is at least 50% higher than the density of the reference material. In other embodiments, the density of contemplated coating solutions, coating materials and/or hard mask compositions has a density that is at least 75% higher than the density of the reference material. In yet other embodiments, the density of contemplated coating solutions, coating materials and/or hard mask compositions has a density that is at least 100% higher than the density of the reference material.

It should be appreciated, however, that the densifying agent not only adjusts the density of the coating solution, the resulting film, hard mask and/or coating material, but it also influences the chemical performance and characteristics, mechanical performance and structural makeup of the final composition that is part of the layered material, electronic component or semiconductor component, such that the final composition is more compatible with the resist material that is coupled to it. More specifically, the densifying agent strongly influences the polymeric characteristics, the structural makeup and the spatial orientation that results in increasing the surface properties of the underlying coating, including not only anti-reflective coatings but other layers and layered materials, for optimal resist performance.

Contemplated densifying agents must perform two separate and sometimes related functions: a) to influence the physical properties of the composition to which it is being added; and b) to influence the mechanical performance and/or structural makeup of the composition, which can also been stated as strongly influencing the polymeric characteristics, the structural makeup and the spatial orientation that results in increasing the surface properties of the layer, coating and/or material, such as an anti-reflective coating, for optimal resist and/or component performance.

Contemplated densifying agents are partly designed to influence the density of the composition to which it is added. The class of potential densifying agents comprises a) any suitable acidic or basic solution, compound, and/or component and/or b) any suitable strength or concentration of an acidic or basic solution, compound and/or component. This compilation of suitable density "influencers" is the larger set of compound from which the ultimate densifying agent is chosen, because the density "influencer" must also be able to influence the mechanical performance and/or structural makeup of the final composition while also making the final spin-on composition compatible or more compatible. By this, for example, it is meant that the chosen densifying agent is also designed to match the solubility parameter, the molecular weight, the melting point or some other physical characteristic of the inorganic materials, spin-on inorganic materials and/or spin-on-glass materials. In other words, the densifying agent and the inorganic materials, spin-on inorganic materials and/or spin-on-glass materials cannot be physically incompatible, depending on the desirable physical characteristic. In preferred embodiments, the desirable physical characteristic is the solubility parameter or the molecular weight. In more preferred embodiments, the desirable physical characteristic is the solubility parameter.

Examples of some suitable densifying agents or density-tuning agents comprise various molar concentrations of the class of bases or amines, such as γ-aminoalkyltrialkoxysilanes and nitrogen-based salts of those silane compounds, specifically γ-aminopropyltriethoxysilanes (APTEOS) and APTEOS-nitrate; water; oxides and alkoxides, such as sodium alkoxides, potassium alkoxides, potassium hydroxide; hydrogen halides, such as hydrogen bromide, hydrochloric acid; acetic acid; sulfuric acid, lactic acid, nitric acid; TMAH; tetra-methyl ammonium acetate (TMAA); tetra-methyl ammonium nitrate (TMAN); amine-based oligomers, including those oligomers with inorganic atoms such as silicon, and combinations thereof. Contemplated nitrogen-based salts may also comprise at least one strong base/weak acid amine salt. Contemplated molar concentrations of the densifying agent include pure, less than about 10 Molar, less than about 1.0 Molar, less than about 0.1 Molar and less than about 0.01 Molar concentrations, depending on the densifying agent chosen for the resist material.

Contemplated resist materials may comprise any photolithographic resist materials, including those that have wavelength ranges around 157 nm, 193 nm, 248 nm and 365 nm. The major reason that the class of resist materials is so broad is that the densifying agent makes it possible to match any photolithographic resist material with an anti-reflective coating and make them compatible with one another. Examples of some contemplated photolithographic resist materials comprise acrylate-based resist materials, epoxy-based chemically amplified resists, fluoropolymer resists (which are especially useful when contemplating a 157 nm absorption wavelength), poly(norbornene-maleic anhydride) alternating co-polymers, polystyrene systems and diazonaphthoquinone/novolac resists.

According to another aspect of the present subject matter, methods for synthesizing the compositions described herein are provided. Contemplated materials are typically synthesized from a variety of silane reactants including, for example, triethoxysilane (HTEOS), tetraethoxysilane (TEOS), methyltriethoxysilane (MTEOS), dimethyldiethoxysilane, tetramethoxysilane (TMOS), methyltrimethoxysilane (MTMOS), trimethoxysilane, dimethyldimethoxysilane, phenyltriethoxysilane (PTEOS), phenyltrimethoxysilane (PTMOS), diphenyldiethoxysilane, and diphenyldimethoxysilane. However, gallium, arsenic, germanium, boron and similar atoms and materials may also be used in conjunction with silicon atoms or as the sole atomic material to produce a spin-on material.

Halosilanes, including chlorosilanes, such as trichlorosilane, methyltrichlorosilane, ethyltrichlorosilane, phenyltrichlorosilane, tetrachlorosilane, dichlorosilane, methyldichlorosilane, dimethyldichlorosilane, chlorotriethoxysilane, chlorotrimethoxysilane, chloromethyltriethoxysilane, chloroethyltriethoxysilane, chlorophenyltriethoxysilane, chloromethyltrimethoxysilane, chloroethyltrimethoxysilane, and chlorophenyltrimethoxysilane are also used as silane reactants.

In some optional embodiments, absorbing compounds may be added and/or incorporated to the inorganic materials, spin-on inorganic materials and/or spin-on-glass materials, as necessary. However, it should be understood that absorbing compounds do not need to be incorporated into the coatings and hardmask compositions contemplated herein. Many naphthalene-, phenanthrene- and anthracene-based compounds have significant absorption at 248 nm and below. Benzene-based, equivalently termed here phenyl-based, compounds have significant absorption at wavelengths shorter than 200 nm. While these naphthalene-, anthracene-, phenanthrene- and phenyl-based compounds are frequently referred to as dyes, the term absorbing compound is used here because the absorptions of these compounds are not limited to wavelengths in the visible region of the spectrum. However, not all such absorbing compounds can be incorporated into inorganic materials, spin-on inorganic materials and/or spin-on-glass materials for use as anti-reflective coating materials. Absorbing compounds suitable for use with the present subject matter have a definable absorption peak centered around wavelengths such as 248 nm, 193 nm, 157 nm or other ultraviolet wavelengths, such as 365 nm, that may be used in photolithography. It is contemplated that a preferred "definable absorption peak" is one that is at least 1 nm in width, wherein width is calculated by those methods commonly known in the art of photolithography. In more preferred embodiments, the definable absorption peak is at least 5 nm in width. In even more preferred embodiments, the definable absorption peak is at least 10 nm in width.

The absorbing compounds may be incorporated interstitially in the inorganic materials, spin-on inorganic materials and/or spin-on-glass materials matrices. The absorbing compounds may also be chemically bonded to the inorganic materials, spin-on inorganic materials and/or spin-on-glass materials. In some contemplated embodiments, the incorporatable absorbing compounds form bonds with the inorganic materials, spin-on inorganic materials and/or spin-on-glass materials backbones or polymer backbone via the accessible reactive groups.

Inorganic materials, spin-on inorganic materials and/or spin-on-glass materials may also comprise a silicon-based compound and an incorporatable organic absorbing compound that absorbs light at wavelengths less than about 375 nm. Further, it is contemplated that in other embodiments at least one of the silicon-based compound or at least one incorporatable organic absorbing compound comprises at least one alkyl group, alkoxy group, ketone group or azo group.

Examples of absorbing compounds suitable for use with the present subject matter are shown in FIGS. 1A-1F, if additional absorbing compounds are suitable or desirable, and include anthraflavic acid, 9-anthracene carboxylic acid, 9-anthracene methanol, 9-anthracene ethanol, 9-anthracene propanol, 9-anthracene butanol, alizarin, quinizarin, primuline, 2-hydroxy-4-(3-triethoxysilylpropoxy)-diphenylketone, 2-hydroxy-4-(3-trimethoxysilylpropoxy)-diphenylketone, 2-hydroxy-4-(3-tributoxysilylpropoxy)-diphenylketone, 2-hydroxy-4-(3-tripropoxysilylpropoxy)-diphenylketone, rosolic acid, triethoxysilylpropyl-1,8-naphthalimide, trimethoxysilylpropyl-1,8-naphthalimide, tripropoxysilylpropyl-1,8-naphthalimide, 9-anthracene carboxy-methyl triethoxysilane, 9-anthracene carboxy-ethyl triethoxysilane, 9-anthracene carboxy-butyl triethoxysilane, 9-anthracene carboxy-propyl triethoxysilane, 9-anthracene carboxy-methyl trimethoxysilane, 9-anthracene carboxy-ethyl tributoxysilane, 9-anthracene carboxy-methyl tripropoxysilane, 9-anthracene carboxy-propyl trimethoxysilane, phenyltriethoxysilane, phenyltrimethoxysilane, phenyltripropoxysilane, 10-phenanthrene carboxy-methyl triethoxysilane, 10-phenanthrene carboxy-ethyl triethoxysilane, 10-phenanthrene carboxy-methyl trimethoxysilane, 10-phenanthrene carboxy-propyl triethoxysilane, 4-phenylazophenol, 4-ethoxyphenylazobenzene-4-carboxy-methyl triethoxysilane, 4-methoxyphenylazobenzene-4-carboxy-ethyl triethoxysilane, 4-ethoxyphenylazobenzene-4-carboxy-propyl triethoxysilane, 4-butoxyphenylazobenzene-4-carboxy-propyl triethoxysilane, 4-methoxyphenylazobenzene-4-carboxy-methyl triethoxysilane, 4-ethoxyphenylazobenzene-4-carboxy-methyl triethoxysilane, 4-methoxyphenylazobenzene-4-carboxy-ethyl triethoxysilane, 4-methoxyphenylazobenzene-4-carboxy-propyl triethoxysilane, and combinations, thereof. It should be appreciated, however, that this list of specific compounds is not an exhaustive list, and that contemplated and preferred compounds can be selected from the chemical compound classes that comprise these specific compounds.

A method of producing a coating material is described herein that includes: providing at least one inorganic compound, providing at least one densifying agent, combining the at least one inorganic compound with the at least one densifying agent to form the coating material, wherein the densifying agent increases the density of the coating material as compared to the density of the at least one inorganic compound. In addition, a method of producing a coating solution comprises providing at least one coating material, providing at least one suitable solvent and mixing the coating material with the solvent to form the coating solution.

One method of making a contemplated composition includes combining at least one inorganic-based composition, at least one densifying agent, an acid/water mixture, such as a nitric acid/water mixture, and at least one solvent to form a reaction mixture; and refluxing the reaction mixture to form the contemplated composition. The composition formed is then diluted with at least one solvent to provide coating solutions that produce films of various thicknesses. The densifying agent may also and alternatively be added during the refluxing step or after the refluxing step. The densifying agent may also be added during the dilution stage where the thickness of the films is being determined. In other suitable embodiments as mentioned, an incorporatable absorbing compound may be added during the steps used to form the reaction mixture.

In another contemplated method of making a contemplated composition, at least one inorganic-based composition, at least one densifying agent, and at least one solvent can be combined to form a reaction mixture. The reaction mixture is then refluxed to form the contemplated composition. The composition formed is diluted with at least one solvent to provide coating solutions that produce films of various thicknesses. The densifying agent in this method may either be a variation of the conventional acid/water mixture, in that a different acid may be added, less acid may be added, or more water may be added. The densifying agent may also be added during the dilution step. And additionally, an incorporatable absorbing compound may be added during the formation of the reaction mixture to form an absorbing composition.

More specifically, a reaction mixture including silane reactants, for example HTEOS, or TEOS and MTEOS, or, TMOS and MTMOS; or, alternatively, tetrachlorosilane and methyltrichlorosilane, at least one densifying agent, such as APTF, APTEOS-N or APTEOS; a solvent or combination of solvents; and an acid/water mixture, is formed in a reaction vessel. Appropriate solvents include acetone, 2-propanol, and other simple alcohols, ketones and esters such as 1-propanol, MIBK, propoxypropanol, and propyl acetate. The acid/water mixture is, for example nitric acid and water. Other protic acids or acid anhydrides, such as acetic acid, formic acid, phosphoric acid, hydrochloric acid or acetic anhydride are alternatively used in the acid mixture. The resulting mixture is refluxed for between approximately 1 and 24 hours to produce the absorbing spin-on solution. As mentioned earlier, the densifying agent may be added during or after the refluxing step, depending on the resist material chosen. Also, as mentioned earlier, the acid concentration and/or strength and the water concentration in the acid/water mixture may be varied in order to become a densifying agent, depending on the resist material chosen for the specific layered material, electronic component or semiconductor component application.

In another embodiment, a silicate polymer may be synthesized or "grown" by using the acid catalyzed methods and monomers, such as TEOS, organoTEOS and MTEOS, disclosed herein. The organoTEOS monomers, as also disclosed herein, gives the resulting film a UV absorbing and/or anti-reflective property. During the reaction process, the reaction is stopped at a specific endpoint that is usually based on a targeted polymer molecular weight value. During the dilution step, whereby the thickness of the silicate or siloxane film is determined, a small amount of APTEOS is added to the mixture. The APTEOS brings the measured pH of the solution (measured using an Ag/AgCl probe) from a value of about 1.2 to nearly 2. The increase in pH also coincides with an increase in the molecular weight of the films. The film density is determined through refractive index measurements at the same thickness and buffered HF acid etch tests. In addition, the refractive index of the film increases with film density. Recent plasma etch data using $O_2/N_2$ (organic etch process of tri-layer resist processing) shows that the etch rate of the film decreases with increasing density. Testing of some of these types of silicate polymers and polymer films can be found in the Examples section.

Any of the components, polymers, compositions, materials, solvents, reaction mixtures and densifying agents contemplated and described herein may be provided by any suitable method, including a) buying at least some of the components, polymers, compositions, materials, solvents, reaction mixtures and densifying agents from a supplier; b) preparing or producing at least some of the components, polymers, compositions, materials, solvents, reaction mixtures and densifying agents in house using chemicals provided by another source and/or c) preparing or producing at least some of the components, polymers, compositions, materials, solvents, reaction mixtures and densifying agents in house using chemicals also produced or provided in house or at the location.

The materials and compositions disclosed herein can be diluted with appropriate solvents or solvent mixtures to achieve coating solutions that produce films of various thicknesses. Suitable diluent solvents include acetone, 2-propanol, ethanol, butanol, methanol, propylacetate, ethyl lactate, propylene glycol propyl ether, referred to commercially as Propasol-P, and combinations thereof. Diluent solvents with high boiling points such as ethyl lactate and propylene glycol propyl ether have been found beneficial. It is believed high boiling point solvents decrease the probability of formation of bubble film defects. In contrast, lower boiling point solvents may become entrapped below a crosslinked top layer of a film and subsequently produce voids when driven off during a baking process step. Additional solvents useful in the invention include ethylene glycol dimethyl ether, alternatively termed glyme, anisole, dibutyl ether, dipropyl ether, propylene glycol methyl ether acetate, pentanol and combinations thereof. Optionally, surfactants, such as the product FC4430, provided by 3M (Minneapolis, Minn.), or the product Megaface R08, provided by DIC (Japan), are also added to the coating solution. The coating solution is typically between about 0.5 and 20% polymer by weight. Prior to use, the coating solution is filtered by standard filtration techniques.

A method of forming an organohydridosiloxane material includes forming a mixture of a dual phase solvent which includes both a non-polar solvent and a polar solvent and a phase transfer catalyst; adding at least one organotrihalosilane, hydridotrihalosilane and adding at least one densifying agent to provide a dual phase reaction mixture; and reacting the dual phase reaction mixture for between 1 and 24 hours to produce the organohydridosiloxane polymer. The phase transfer catalyst includes but is not limited to tetrabutylammonium chloride and benzyltrimethylammonium chloride. Exemplary non-polar solvents include, but are not limited to, pentane, hexane, heptane, cyclohexane, benzene, toluene, xylene, halogenated solvents such as carbon tetrachloride and mixtures thereof. Useful polar solvents include water, alcohols, and alcohol and water mixtures. The polymer solution is diluted and filtered as described above to form a coating solution.

The density-tuned coating solutions (which may or may not be absorbing coating solutions) are applied to various substrates to form layered materials, layers used in semiconductor processing, or layers used in electronic components, depending on the specific fabrication process, typically by conventional spin-on deposition techniques. These techniques include a dispense spin, a thickness spin, and thermal bake steps, to produce suitable coating. Typical processes include a thickness spin of between 1000 and 4000 rpm for about 20 seconds and two or three bake steps at temperatures between 80° C. and 300° C. for about one minute each. The density-tuned coatings, according to the present invention exhibit refractive indices between about 1.3 and about 2.0. It should also be noted that the density-tuned coatings contemplated herein have increased refractive index measurements relative to their non-density-tuned counterparts.

Substrates contemplated herein may comprise any desirable substantially solid material. Particularly desirable substrate layers would comprise films, glass, ceramic, plastic, metal or coated metal, polymer or composite material. In preferred embodiments, the substrate comprises a silicon or germanium arsenide die or wafer surface, a packaging surface such as found in a copper, silver, nickel or gold plated leadframe, a copper surface such as found in a circuit board or package interconnect trace, a via-wall or stiffener interface ("copper" includes considerations of bare copper and it's oxides), a polymer-based packaging or board interface such as found in a polyimide-based flex package, lead or other metal alloy solder ball surface, glass and polymers such as polyimide. In more preferred embodiments, the substrate comprises a material common in the packaging and circuit board industries such as silicon, copper, glass, and another polymer.

It should be noted that many of the applications, uses and methods of production of the compounds disclosed herein are analogous to and/or can be found in including those materials and coatings found in U.S. Pat. No. 6,268,457 issued on Jul. 31, 2001; U.S. Pat. No. 6,365,765 issued on Apr. 2, 2002; U.S. Pat. No. 6,368,400 issued on Apr. 9, 2002; and U.S. Pat. No. 6,506,497 issued on Jan. 14, 2003; U.S. Pat. No. 7,012,125 issued on Mar. 14, 2006; U.S. Pat. No. 6,605,362 issued on Aug. 12, 2003; U.S. Pat. No. 6,969,753 issued on Nov. 29, 2005; U.S. Pat. No. 6,956,097 issued on Oct. 18, 2005; and U.S. Pat. No. 6,824,879 issued on Nov. 30, 2004; PCT Applications Serial Nos: PCT/US00/15772 filed on Jun. 8, 2000; WO 02/06402 filed on Jul. 12, 2001; PCT/US01/45306 filed on Nov. 15, 2001; PCT Application PCT US02/36327 filed on Oct. 31, 2002; European Patent Applications Serial No. 00941275.0 filed on Jun. 6, 2000; and 01958953.0 filed on Jul. 17, 2001, and all other related foreign and domestic applications, which are all commonly assigned and incorporated herein by reference in their entirety.

EXAMPLES

Modified silicate films were produced and tested in order to show the increase in density over reference materials. These silicate films have been used in non-, partial- and total-etch back planarization processes. Silicate films described herein are utilized in some embodiments as a transfer layer for tri-level photoresist patterning. These films are required to preserve the pattern integrity during the pattern transfer etch through a planarizing organic underlying layer.

Table 1 shows 4 silicate films that are formed by spinning a coating solution onto a wafer and baking the solution to form a film. The fifth row shows a film that is formed via CVD deposition.

| SAMPLE | BAKE (° C.) | DENSITY (G/CM$^3$) |
|---|---|---|
| Spin-On, pH - 2.5 | 80/200 | 1.82 |
| Spin-On, pH - 4 | 80/200 | 2.09 |
| Spin-On, pH - 2.5 | 80/300 | 2.09 |
| Spin-On, pH - 4 | 80/300 | 2.04 |
| CVD TEOS Oxide | N/A | 2.27 |

Table 2 shows refractive index measurements of density-modified silicate films at 633 nm and 500:1 buffered HF etch rates. These films were baked at 80/250° C. in air.

| FILM | PH | RI @ 633 NM | BOE: AVERAGE ER (PER MINUTE) |
|---|---|---|---|
| Film 1 | 2 | 1.464 | not measured |
| Film 2 | 2.5 | 1.415 | 7990.86 |
| Film 3 | 4 | 1.422 | 3766.38 |
| Film 4 (1.8X) | 2.5 | 1.440 | 568.2 |
| Film 5 (1.8X) | 4 | 1.444 | 302.76 |

Table 3 shows two control silicate films at different pHs and two density-modified silicate films. The etch rate shown in an RIE process for organic films. The etch tool is a TEL Unity DRM. The RIB recipe is 20 mT, 1000W, 37 mm and $N_2/O_2$=120/30 sccm. Bake Temperature is 150/300° C. with an ambient air bake and no nitrogen. For reference, the etch rate for a plasma enhanced CVD TEOS $SiO_2$ film is 2.91 Å/s. The etch rate for organic dielectric low-k film is 67 Å/s.

| FILM | ETCH TIME (SEC) | TH. PRE-ETCH (Å) | TH. POST-ETCH (Å) | ETCH RATE (Å/MIN) | ETCH RATE (Å/SEC) | NONUNI. PRE-ETCH (%) | NONUNI. POST-ETCH (%) |
|---|---|---|---|---|---|---|---|
| Control 1 pH = 2.5 | 15 | 833 | 739 | 373.98 | 6.23 | 0.97 | 0.98 |
| Control 2 pH = 4 | 15 | 812 | 733 | 316.57 | 5.28 | 0.97 | 0.98 |
| Sample 1 pH = 2.5 | 15 | 797 | 757 | 159.57 | 2.66 | 0.97 | 0.98 |
| Sample 2 pH = 4 | 15 | 826 | 781 | 178.26 | 2.97 | 0.97 | 0.87 |

Figure 2:
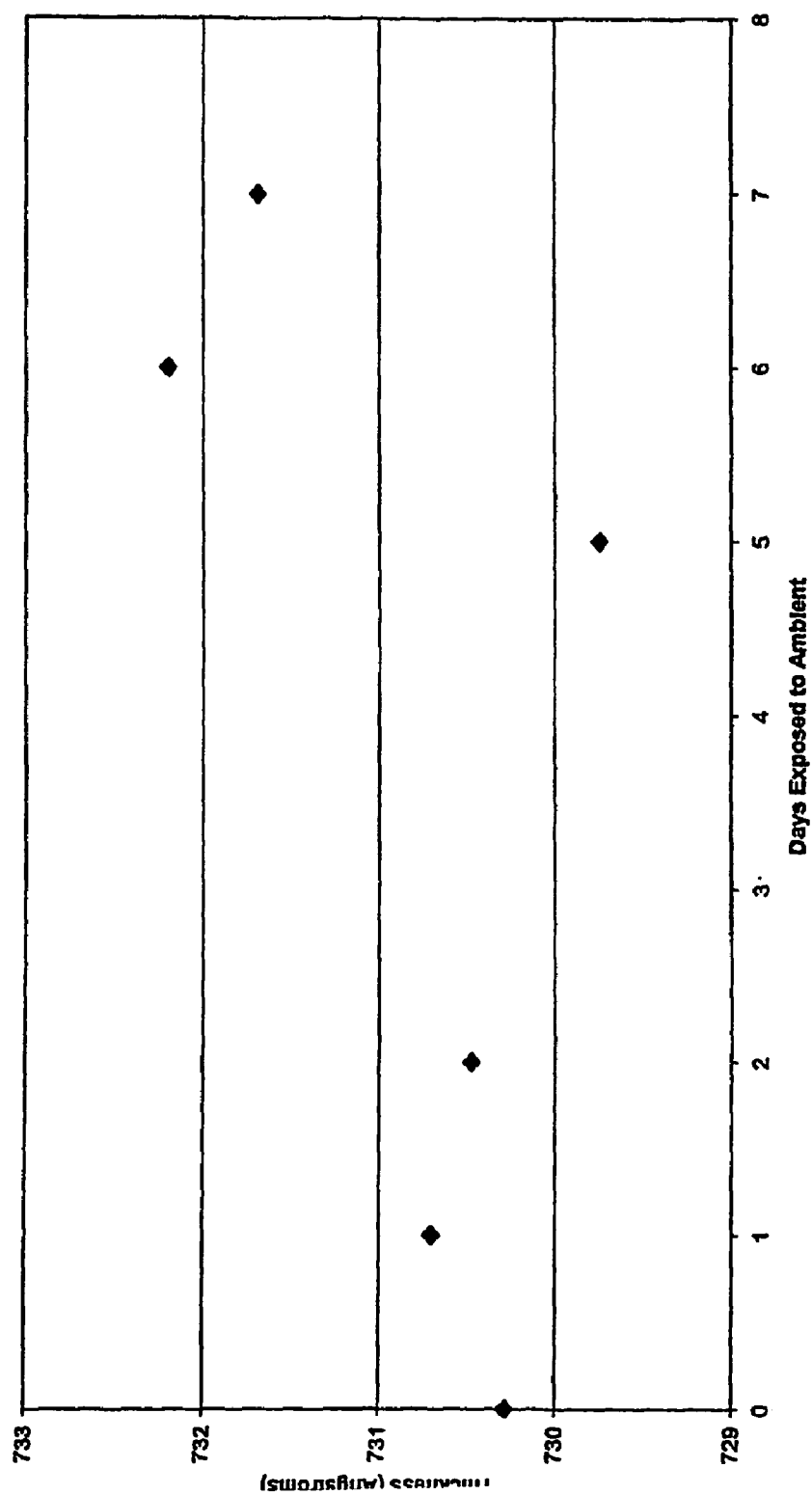
FIG. 2 shows thickness stability data for a control/reference material.
Figure 3:
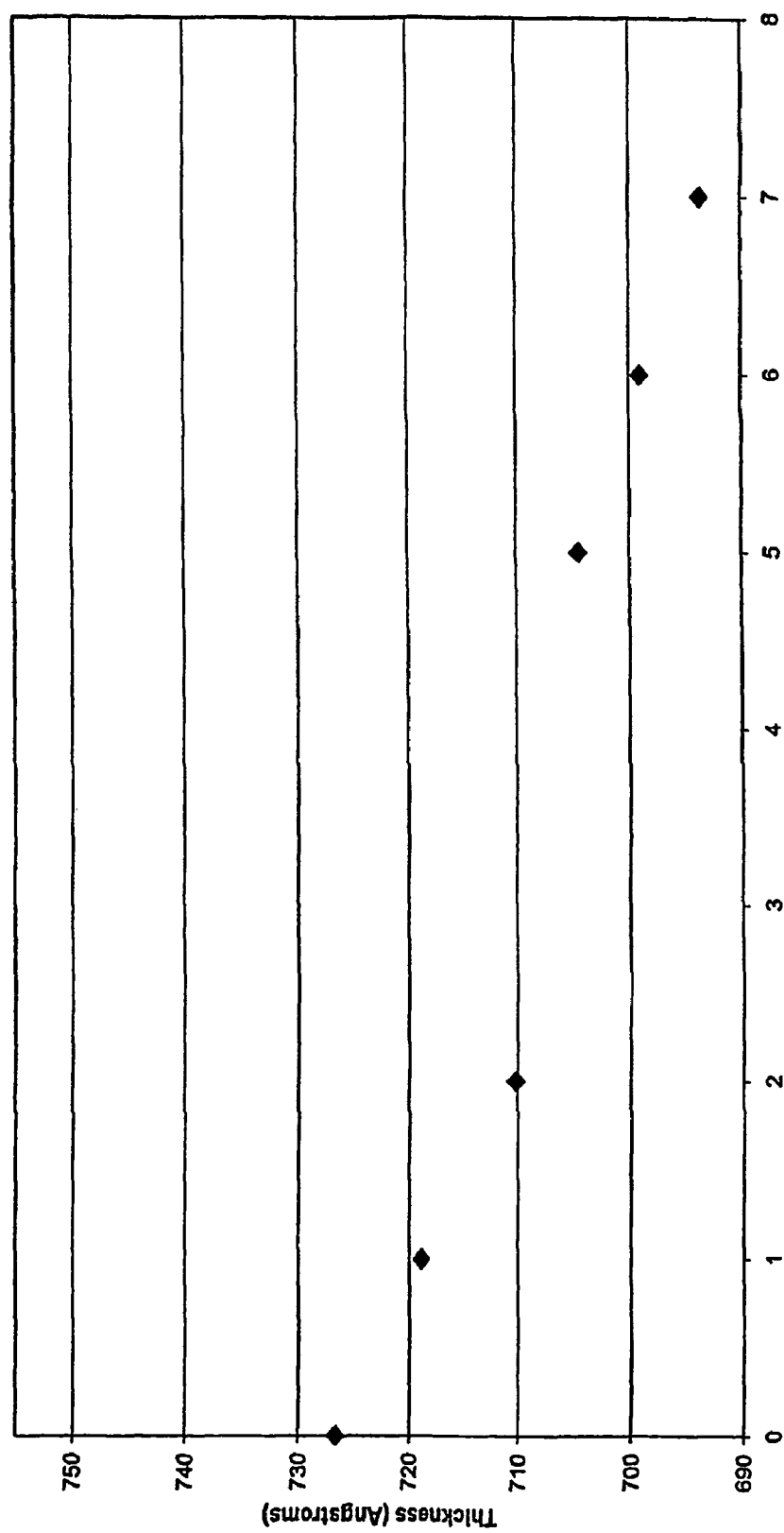
FIG. 3 shows thickness stability data for a control/reference material.
Figure 4:
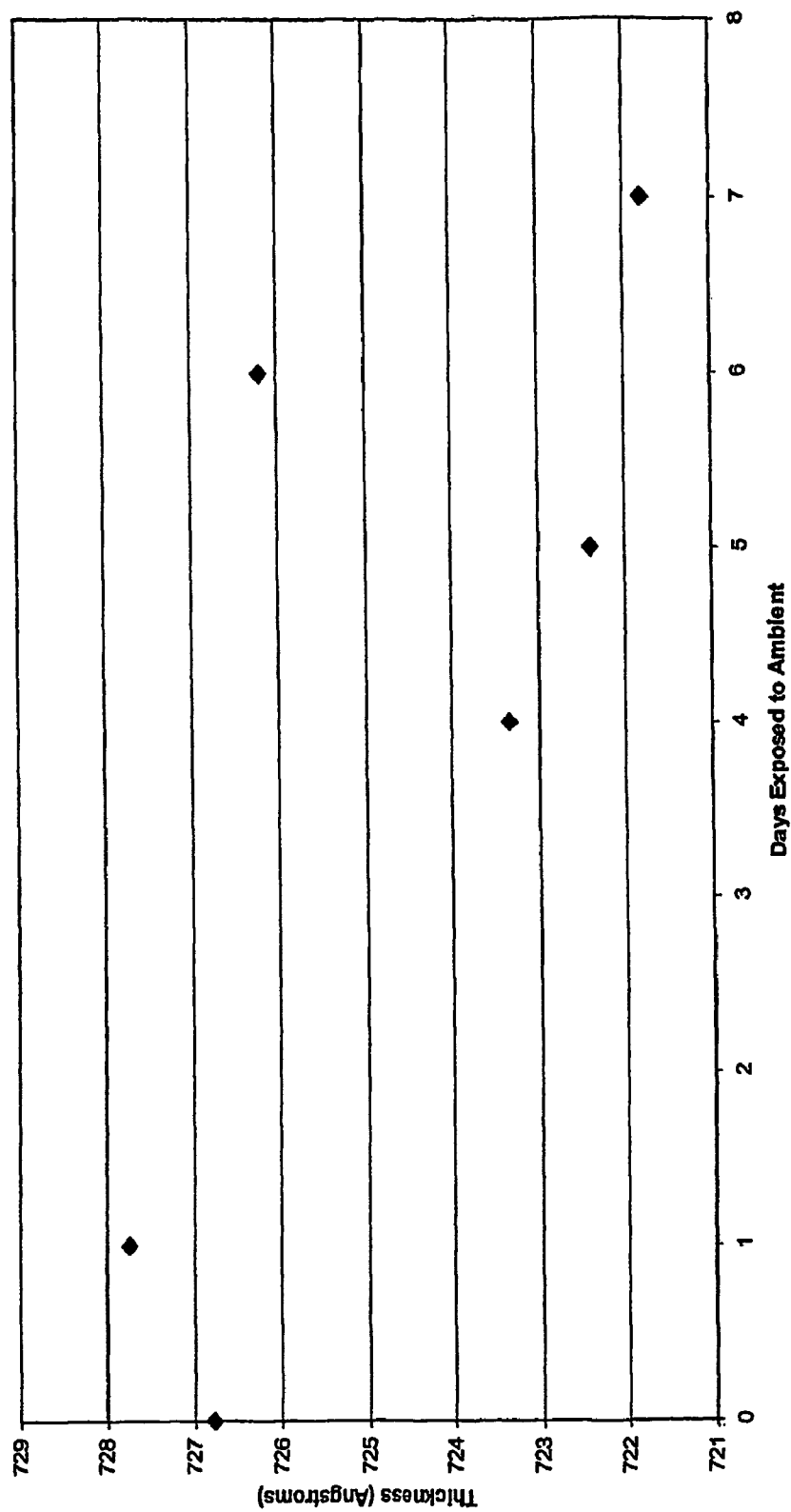
FIG. 4 shows thickness stability data for a contemplated coating material.
Figure 5:
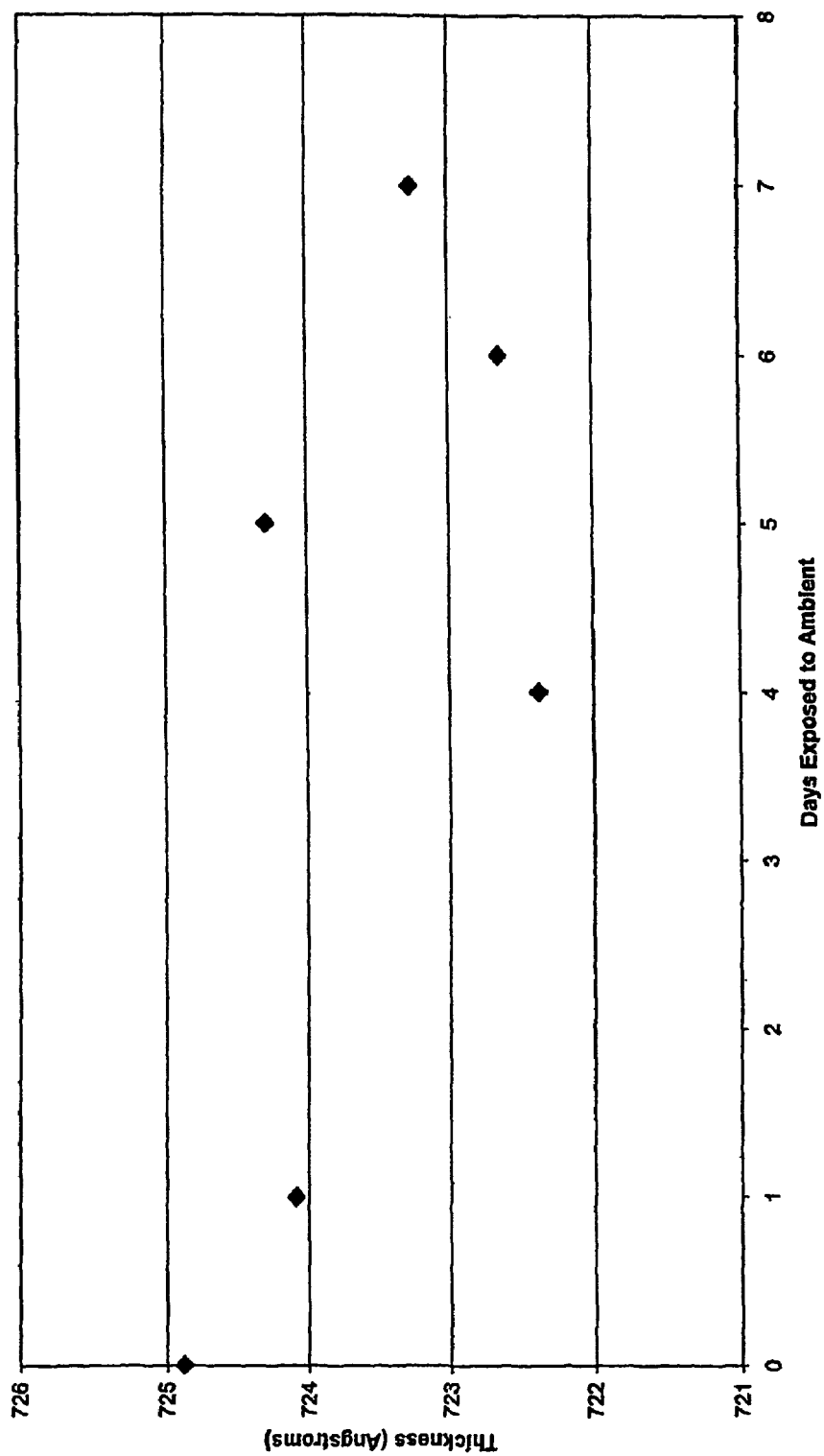
FIG. 5 shows thickness stability data for a contemplated coating material.

FIGS. 2-5 show thickness stability experiments for the films listed in Table 3. Controls 1 and 2 are shown in FIGS. 2 and 3. FIGS. 4 and 5 shows data collected for Samples 1 and 2.

The examples and syntheses found in the above-referenced US, PCT and foreign applications are also applicable and relevant to the disclosure presented herein.

Thus, specific embodiments and applications of coating and hard mask compositions and methods to produce coating and hard mask materials that comprise a density-tuning agent or densifying agent and have increased density characteristics have been disclosed. It should be apparent, however, to those skilled in the art that many more modifications besides those already described are possible without departing from the inventive concepts herein. The inventive subject matter, therefore, is not to be restricted except in the spirit of the disclosure presented herein. Moreover, in interpreting the specification, all terms should be interpreted in the broadest possible manner consistent with the context. In particular, the terms "comprises" and "comprising" should be interpreted as referring to elements, components, or steps in a non-exclusive manner, indicating that the referenced elements, components, or steps may be present, or utilized, or combined with other elements, components, or steps that are not expressly referenced.

We claim:

1. A coating material comprising:
   at least one inorganic-based compound, wherein the at least one inorganic-based compound comprises at least one silicon-based compound,
   at least one densifying agent, wherein the densifying agent increases the density of the coating material as compared to the density of the at least one inorganic-based compound, wherein the at least one densifying agent comprises at least one base comprising an amine, wherein the at least one amine comprises APTEOS-nitrate, and
   at least one high boiling point solvent, wherein the solvent includes ethyl lactate, propylene glycol propyl ether, ethylene glycol dimethyl ether, anisole, dibutyl ether, dipropyl ether, propylene glycol methyl ether acetate or combinations thereof.

2. The coating material of claim 1, wherein the at least one silicon-based compound comprises at least one siloxane compound, at least one silazane polymer, dimethylsiloxane, diphenylsiloxane, methylphenylsiloxane, at least one silicate polymer, at least one silsilic acid derivative or combinations thereof.

3. The coating material of claim 2, wherein the at least one siloxane compound comprises methylsiloxane, methylsilsesquioxane, phenylsiloxane, phenylsilsesquioxane, methylphenylsiloxane, methylphenylsilsesquioxane or combinations thereof.

4. The coating material of claim 1, wherein the at least one silicon-based compound comprises at least one siloxane polymer.

5. The coating material of claim 1, wherein the at least one silicon-based compound comprises acrylic siloxane polymers, silsesquioxane-based polymers, derivatives of silicic acid, organosiloxane polymers, organosilsesquioxane polymers or combinations thereof.

6. The coating material of claim 1, wherein the at least one densifying agent further comprises tetra-methyl ammonium hydride (TMAH); tetra-methyl ammonium acetate (TMAA); tetra-methyl ammonium nitrate (TMAN) or amine-based oligomers.

7. A spin-on coating solution comprising the coating material of claim 1.

8. A method of producing a coating material comprises:
   providing at least one inorganic-based compound, wherein the at least one inorganic-based compound comprises at least one silicon-based compound,
   providing at least one densifying agent, wherein the at least one densifying agent comprises at least one base comprising an amine, wherein the at least one amine comprises APTEOS-nitrate,
   providing at least one high boiling point solvent, wherein the solvent includes ethyl lactate, propylene glycol propyl ether, ethylene glycol dimethyl ether, anisole, dibutyl ether, dipropyl ether, propylene glycol methyl ether acetate or combinations thereof, and
   combining the at least one inorganic-based compound with the at least one densifying agent and the at least one high boiling point solvent to form the coating material.

9. The method of claim 8, wherein the at least one silicon-based compound comprises at least one siloxane compound, at least one silazane polymer, dimethylsiloxane, diphenylsiloxane, methylphenylsiloxane, at least one silicate polymer, at least one silsilic acid derivative or combinations thereof.

10. The method of claim 9, wherein the at least one siloxane compound comprises methylsiloxane, methylsilsesquioxane, phenylsiloxane, phenylsilsesquioxane, methylphenylsiloxane, methylphenylsilsesquioxane or combinations thereof.

11. The method of claim 8, wherein the at least one silicon-based compound comprises at least one siloxane, at least one silsesquioxane polymer, derivatives of silsilic acid or a combination thereof.

12. The method of claim 8, wherein the at least one silicon-based compound comprises acrylic siloxane polymers, silsesquioxane-based polymers, derivatives of silici acid, organosiloxane polymers, organosilsesquioxane polymers or combinations thereof.

13. The method of claim 8, wherein the at least one densifying material further comprises tetra-methyl ammonium hydride (TMAH); tetra-methyl ammonium acetate (TMAA); tetra-methyl ammonium nitrate (TMAN) or amine-based oligomers.

14. A film formed from the coating material of claim 1.

15. A film formed from the spin-on coating solution of claim 7.

16. A film formed from the method of claim 8.

* * * * *